(12) United States Patent
Leventer et al.

(10) Patent No.: US 11,799,722 B2
(45) Date of Patent: *Oct. 24, 2023

(54) SUPPORT FOR A SCALABLE AND HIGHLY AVAILABLE (HA) SERVICE PLATFORM

(71) Applicant: Harmonic, Inc., San Jose, CA (US)

(72) Inventors: Amir Leventer, Kfar Saba (IL); Daniel Ginsburg, Tel Aviv (IL); Robert Gaydos, Harleysville, PA (US); Nimrod Ben-Natan, San Jose, CA (US)

(73) Assignee: Harmonic, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/844,451

(22) Filed: Jun. 20, 2022

(65) Prior Publication Data

US 2022/0329487 A1    Oct. 13, 2022

Related U.S. Application Data

(63) Continuation-in-part of application No. 16/833,121, filed on Mar. 27, 2020, now Pat. No. 11,368,553.

(Continued)

(51) Int. Cl.
*H04L 41/0816* (2022.01)
*H04L 67/133* (2022.01)
*H04L 45/74* (2022.01)

(52) U.S. Cl.
CPC .......... *H04L 41/0816* (2013.01); *H04L 45/74* (2013.01); *H04L 67/133* (2022.05)

(58) Field of Classification Search
CPC ......... H04L 67/34; H04L 67/16; H04L 67/40; H04L 61/103; H04L 69/325;
(Continued)

(56) References Cited

U.S. PATENT DOCUMENTS 6,693,878 B1    2/2004 Daruwalla
9,686,198 B1    6/2017 Smith
(Continued)

FOREIGN PATENT DOCUMENTS

CN    105472486 A  *  4/2016

*Primary Examiner* — Patrice L Winder
*Assistant Examiner* — Angela M Widhalm De Rodriguez
(74) *Attorney, Agent, or Firm* — Brokaw Patent Law PC; Christopher J. Brokaw (57) ABSTRACT

Supporting a scalable and Highly Available (HA) service platform. The service platform may be a virtual Cable Modem Termination System (vCMTS), a Passive Optical Network (PON), or a Broadband Network Gateway (BNG). A software component receives, from the service platform, an update about a particular unit of equipment, such as a cable modem (CM), Optical Network Unit (ONU)/Optical Network Terminal (ONT), or customer premises equipment (CPE). In response to receiving the update, the software component provides, to at least one edge router, route data for the particular unit of equipment. The route data informs the edge router of a next hop network address for a network address of the unit of equipment. The edge router is not and need not be provided with either (a) any Address Resolution Protocol (ARP) data for the particular unit of equipment and (b) any Neighbor Discovery (ND) data for the particular unit of equipment.

30 Claims, 3 Drawing Sheets

Related U.S. Application Data (60) Provisional application No. 62/825,211, filed on Mar. 28, 2019.

(58) Field of Classification Search
CPC ... H04L 41/0816; H04L 67/133; H04L 45/74; G06F 8/65
See application file for complete search history.

(56) References Cited

U.S. PATENT DOCUMENTS

| | | |
|---|---|---|
| 2002/0145981 A1 | 10/2002 | Klinker |
| 2006/0171320 A1 | 8/2006 | Vasseur |
| 2007/0064702 A1 | 3/2007 | Bates |
| 2010/0040073 A1 | 2/2010 | Washburn |
| 2013/0107725 A1 | 5/2013 | Jeng |
| 2014/0269713 A1* | 9/2014 | Huang ................ H04L 45/308 370/392 |
| 2015/0172072 A1 | 6/2015 | Rakib |
| 2015/0257081 A1* | 9/2015 | Ramanujan ............ H04L 45/24 370/329 |
| 2017/0085674 A1 | 3/2017 | Carney |
| 2017/0244577 A1 | 8/2017 | Patrick |
| 2018/0192327 A1* | 7/2018 | Gaydos ............ H04W 72/0446 |
| 2019/0166013 A1 | 5/2019 | Shaikh |
| 2020/0068014 A1 | 2/2020 | Sarkar |

\* cited by examiner

SUPPORT FOR A SCALABLE AND HIGHLY AVAILABLE (HA) SERVICE PLATFORM

CLAIM OF PRIORITY

The present application is a continuation-in-part of, and claims priority to, U.S. Non-Provisional patent application Ser. No. 16/833,121, U.S. Pat. No. 11,368,553, entitled "Support for a Scalable and Highly Available (HA) Virtual Cable Modem Termination System (VCMTS)," filed Mar. 27, 2020, issued Jun. 21, 2022, the entire disclosure of which is hereby incorporated by reference for all purposes in its entirety as if fully set forth herein.

U.S. Non-Provisional patent application Ser. No. 16/833, 121 claims priority to U.S. Provisional Patent Application No. 62/825,211, entitled "vCMTS with Layer 3 Capabilities," filed Mar. 28, 2019, the entire disclosure of which is hereby incorporated by reference for all purposes in its entirety as if fully set forth herein.

FIELD OF THE INVENTION

Embodiments of the invention generally relate to a scalable and highly available (HA) service platform.

BACKGROUND

Converged Cable Access Platform (CCAP) is a standard, administered by CableLabs of Louisville, Colo., for an architecture employed by a cable operator. The motivation behind CCAP is to lower the operating costs of cable operators via a single platform which can offer traditional video and broadband services to their consumers. CCAP is a managed architecture as it leverages existing cable technologies and makes provisions for new ones that may arise. As a result, cable operators may take different paths towards conforming to the CCAP standard, and thereafter, may continue to evolve their architecture in different ways post-compliance to CCAP.

CableLabs has issued a Remote PHY family of specifications, known as the MHAv2 specifications (Modular Headend Architecture version 2). These specifications describe how a CCAP platform may be separated into two components, (1) a CCAP Core located at a cable headend, and (2) a Remote PHY device (RPD), which is typically located outdoors. An RPD may be located, for example, at the junction of the fiber and coax plants in an optical node serving as a Remote PHY Node (RPN). A CCAP core can control and setup data paths with multiple RPDs situated in multiple fiber nodes.

The function of a RPN is to convert downstream DOCSIS data, MPEG video, and out-of-band (OOB) signals from digital to analog one way and transmit them over a plurality of coaxial cables leading to customer premises equipment (CPE) residing at cable subscribers' homes, and receive upstream data, video, and OOB signals from coaxial cables in analog format and convert them to digital the other way. The digital signals are exchanged between the CCAP Core and the RPD, comprised within the RPN, typically over digital fiber.

Remote PHY nodes are designed to be deployed outdoors near the physical area to be serviced by the RPN. A non-limiting, illustrative example of an RPN includes Harmonic, Inc.'s CableOS™ Ripple-1 Remote PHY node.

An RPN is composed of an outer housing that surrounds at least one power supply and at least one Remote Device (RPD). The outer housing of an RPN is designed to provide a hermetically sealed environment to the interior of the RPN. The hermetically sealed environment provided by the outer housing of RPN helps protect internal components such as the power supply and one or more RPDs from outdoor environmental factors, such as humidity, water, debris, and changes in pressure. There are other types of cable nodes that might contain an RPD other than RPN, such as a Remote MACPHY node (RMN).

A Cable Modem Termination System (CMTS) refers to a piece of equipment, typically located at a cable company's headend, which is used to provide high speed data services to cable subscribers. Current industry vendors of CMTSs (one example being Cisco Corporation's product offering called CBR-8) are expected to introduce CCAP-compliant based products on their existing CMTS chasses. Industry CCAP cores are expected to maintain the vendor's proprietary chassis, proprietary packet routing engine cards, and proprietary line cards with custom hardware to support the bit-intensive high-speed encryption/decryption and Cyclic Redundancy Checks (CRC) generation required for the downstream External PHY Interface (DEPI) and upstream External PHY Interface (UEPI) data traffic forwarded between the CCAP Cores and Remote Phy Devices (RPDs).

Harmonic, Inc. of San Jose, Calif., offers a software product known as a virtual Cable Modem Termination System (vCMTS). A vCMTS, as opposed to a traditional CMTS, is software that may execute upon one or more commercial off-the shelf (COTS) packet switch/routers and/or COTS computing servers. As such, a vCMTS may be implemented without any proprietary or specialized hardware components. A commercial example of a virtual CCAP is CableOS, available from Harmonic, Inc. of San Jose, Calif.

Figure 1:
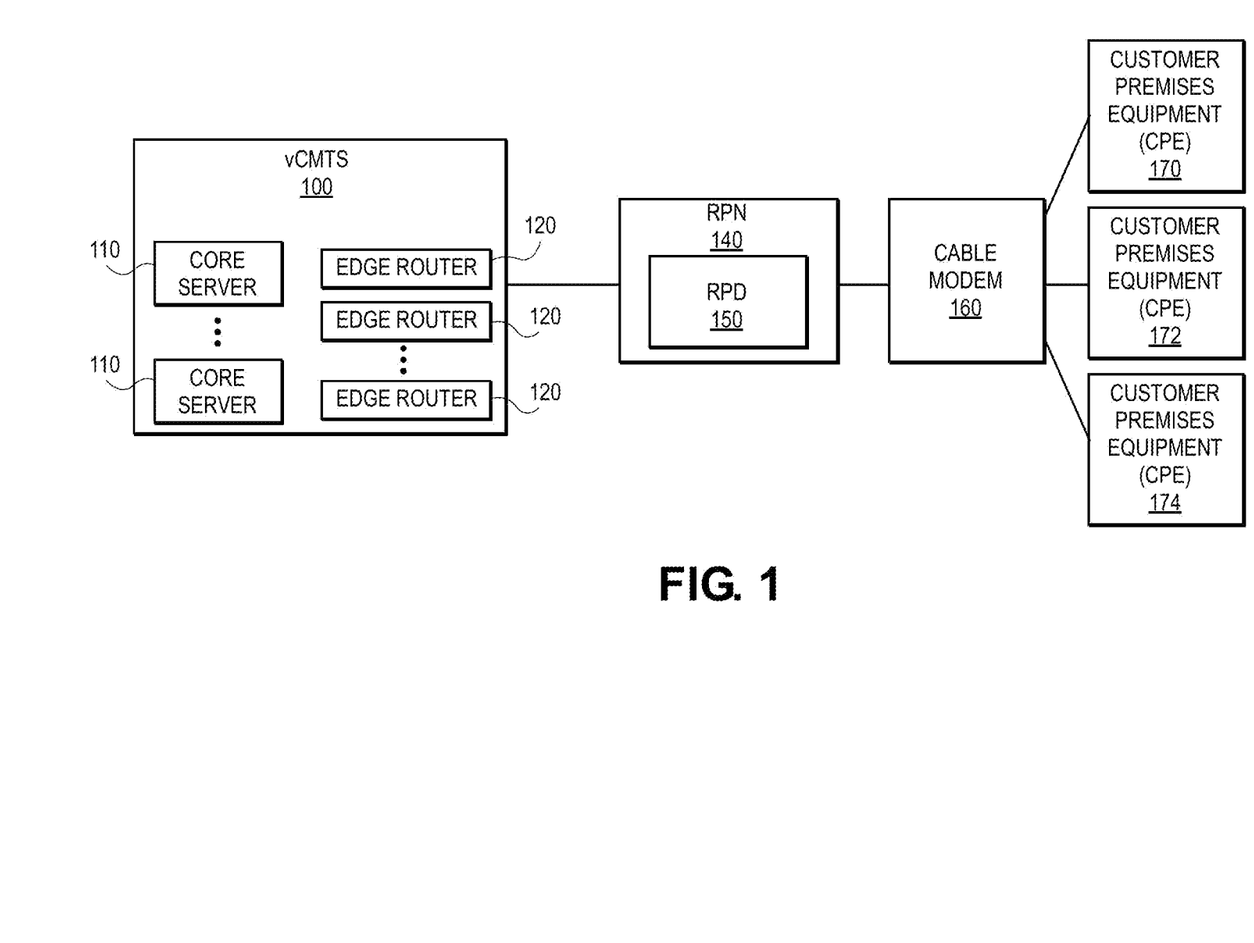
FIG. 1 is a block diagram of exemplary architecture of a virtual Cable Modem Termination System (vCMTS) according to the prior art.

FIG. 1 is a block diagram of vCMTS 100 in accordance with the prior art. vCMTS 100 may comprise one or more core servers (CS) 110 and one or more edge routers (ER) 120. A core server 110 is a software component that perform CMTS functions for one or more remote PHY devices (RPDs). Edge router (ER) 120 is a router for CMTS traffic. An ER 120 may also be referred to as a Core Routing Engine (CRE). A vCMTS may comprise any number of CSs 110 and any number of ERs 120. Core server 110 and edge router 120 are described in additional detail in U.S. Pat. No. 10,020, 962, issued Jul. 10, 2018, entitled Virtual Converged Cable Access Platform (CCAP) Core, the contents of which are hereby incorporated by reference in their entirety as if fully set forth here.

While FIG. 1 depicts a single RPD 140 for simplicity, in a real-world deployment, a large number of RPDs 140 will interact with vCMTS 100. Each RPD 140 may communicate over a coaxial cable to each of a plurality of cable modems (CMs) 160

Each cable modem 160 will typically be deployed within a customer premises and provide service to one or more customer premises equipment 170, 172, and 174. Non-limiting, illustrative examples of customer premises equipment 170, 172, and 174 includes a personal computer (PC), a laptop computer, a tablet computer, a cell phone, and wired or wireless device capable of connecting to CM 160.

A cable operator is not expected to directly manage the RPDs 150 themselves; instead, the cable operator configures all aspects of RPD operation and obtains all status information from vCMTS 100. vCMTS 100 communicates with each RPD 150 over a fiber connection using various protocols (such as, for example, DEPI and UEPI) for configuration, status, and data exchange.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for supporting a scalable and Highly Available (HA) service platform are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Drawbacks of Prior Approaches

A virtue of a prior art virtual Cable Modem Termination System (vCMTS) is that it may be implemented upon commercial-off-the-shelf (COTS) hardware. However, while this characteristic of a vCMTS offers numerous advantageous, it does present certain obstacles in the pursuit of a scalable and Highly Available (HA) implementation.

To illustrate, in present vCMTS implementations, each cable modem (CM) and each customer premises equipment (CPE) must have an Address Resolution Protocol (ARP)/Neighbor Discovery (ND) entry that is maintained by at least one router. The amount of effort and traffic required to maintain the accuracy of such a voluminous number of entries can induce operational strain and problems.

Further, each commercial off-the-shelf (COTS) router only can support a finite number of ARP/ND entries. The maximum capacity of such entries which may be supported by a COTS router, when compared to the aggregate need, is quite limited in the eyes of the inventors. Thus, present implementations must add additional routers to scale, but doing so, of course, increases operational costs as well as the aggregate amount of exchanged traffic to ensure records across the system are accurate.

It has also been observed that when supporting multiple clusters that share a single subnet but are separated physically, the coordination involved renders a typical prior art implantation susceptible to error due the complexity in exchanging the necessary information to maintain consistent entries across all routers at all physical locations.

In a similar vein, ensuring stable Prefix Delegation (PD) with a vCMTS implementation is problematic using a present-day COTS router. A network address prefix must follow a cable customer when the cable customer moves to a new physical location. Thus, when a cable customer disconnects from the cable equipment associated with a first geographical location and then reconnects to different cable equipment located remotely to their original physical location, network address information, such as but not limited to their subnet prefix, must be updated across the vCMTS system; unfortunately, at present doing so is operationally complex and error prone.

Present day vCMTS implementations are limited in their support for being highly available (HA) because at present supporting a HA switchover operation requires exchanging O(n) messages, where n is total number of CM/CPEs within the system.

In view of these issues, it is desirable to provide for a scalable and highly available (HA) vCMTS which overcomes these disadvantages.

Supporting a Scalable and HA Service Platform

Advantageously, embodiments of the invention provide for a scalable and highly available (HA) service platform through a novel and non-obvious component referred to herein as a router notifier software component. Embodiments of the invention may operate with different types of service platforms, such as but not limited to a virtual Cable Modem Termination System (vCMTS), a Passive Optical Network (PON), or a Broadband Network Gateway (BNG). For purposes of describing a concrete example, several specific embodiments will be discussed relative to the service platform being a vCMTS, although it should be understood that embodiments may operate with numerous types of service platforms.

Figure 2:
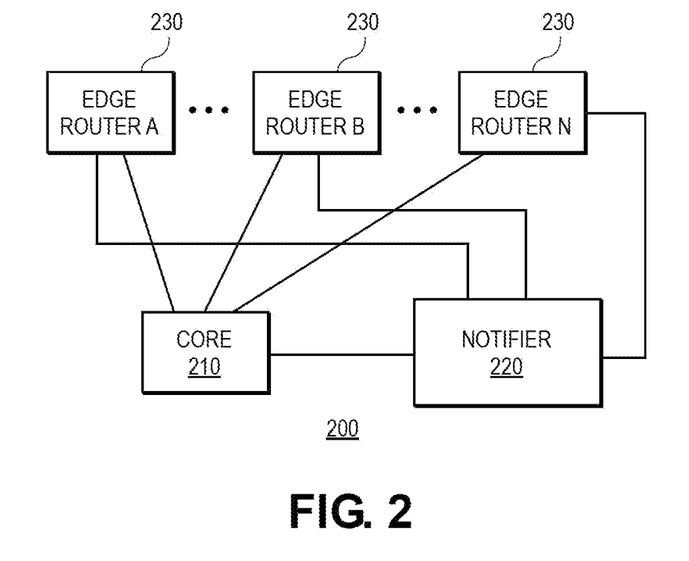
FIG. 2 is a block diagram illustrating a vCMTS having a router notifier software component in accordance with an embodiment of the invention.

FIG. 2 is a block diagram illustrating a vCMTS 200 having a router notifier software component 220 in accordance with an embodiment of the invention. As shown by FIG. 2, vCMTS 200 also comprises core 210 and a plurality of edge routers 230. Core 210, as broadly used herein, refers to one or more core servers which perform core CTMS functions for vCMTS.

Router notifier software component (or "notifier") 220, as broadly used herein, refers to any functional component capable of notifying edge routers 230 with route data for cable modems (CMs) and customer premise equipment (CPE). The actions performed by notifier 220 shall be explained in greater detail below with reference to FIG. 3.

In an embodiment, edge routers in vCMTS 200 need not process DHCP at all, thereby avoiding the need to synchronize DHCP state across MC-LAG peers. Recall that prior art routers learned of, for example, PD by inspecting DHCP messages in the process of relaying them. When a prior art router learned something new from inspecting a DHCP message, the learned information was synchronized to an MC-LAG peer. Advantageously, in accordance with an embodiment of the invention, routers receive information about routes from notifier 220; consequently, routers need not learn anything from inspecting DHCP packets. As a result of routers not shouldering the responsibility of processing DHCP messages, a DHCP relay may be implemented as a separate component executing on a separate server within vCMTS 200.

In one embodiment, notifier 220 executes on the same physical device which is also executing software that performs functions of vCMTS 200, e.g., all of or a portion of core 210. In other embodiments, notifier 220 may execute on a different physical device than the one or more other physical devices that execute software performing the other functions of vCMTS 200, e.g., all of or a portion of core 210.

Figure 3:
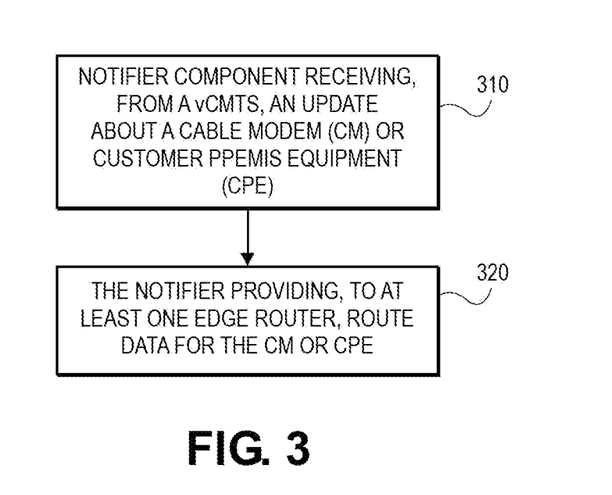
FIG. 3 is a flowchart illustrating the functional steps performed by a router notifier software component in accordance with an embodiment of the invention.

FIG. 3 is a flowchart illustrating the functional steps performed by notifier 200 in accordance with an embodiment of the invention. In step 310, notifier 200 receives, from core 210, an update about a particular cable modem (CM) or customer premises equipment (CPE). This update may be sent to notifier by core 210 as a result of core 210 determining that a particular CM or a particular CPE either become online or went offline.

The update sent in step 310 may be transmitted by a variety of different mechanisms. For example, in an embodiment, core 210 may use a remote procedure call (RPC) to send information about the update to notifier 220.

After receiving the update of step 310, notifier 220 performs step 320. In step 320, notifier 220 provides, to at least one edge router 230, route data for the particular CM or CPE identified by the update received in step 310. The route data sent in step 320 informs the receiving edge router 230 of a next hop network address for a network address of the particular CM or CPE.

Notifier 220 may send the route data to one or more edge router 230 via several different mechanisms. For example, in one embodiment, the route data may be sent to an edge router using Border Gateway Protocol (BGP).

Advantageously, edge routers 230 are not provided any Address Resolution Protocol (ARP) data for any CMs or any CPEs and are not provided any Neighbor Discovery (ND) data for any CMs or any CPEs. Beneficially, within vCMTS 200, there need not be any exchange of ARPs or NDs between core 210 and edge routers 230 for any CMs or any CPEs due to the exchange of route data.

A route identifies (a) what network addresses are reachable, and (b) the next-hop address. Consider, for example, the route: 1.1.1.1/32→2.2.2.2. In this example, 1.1.1.0/32 corresponds to reachability information, and 2.2.2.2 corresponds to the next-hop address. The next-hop address (2.2.2.2) does have an ARP-table entry on the edge router, but not the address 1.1.1.1. The ARP entry maintained by the edge router identifies, for the physical located at the network address of 2.2.2.2, its (a) MAC address and (b) the edge router's port.

As used herein, the next-hop address is a location within an instance of vCMTS, and each instance of a vCMTS services hundreds or thousands or more CMs and CPEs, each of which have their own network address. Each CM or CPE is represented by an individual route within a particular instance of a vCMTS. A set of typical routes, for example, might appear as the following:
  1.1.1.1/32→2.2.2.2.2
  1.1.1.2/32→2.2.2.2.2
  1.1.1.100/32→2.2.2.2.2
All of the above routes would share the same next-hop address, namely 2.2.2.2.

When an instance at a particular network address in the vCMTS system fails, another instance assumes responsibility and takes over for that network address. For example, assume that the network address of 2.2.2.2. In response, the edge router must be updated with the new physical location of the network address 2.2.2.2. This may be accomplished by notifier 220 sending a single ARP message (or ND when using IPv6) to the responsible edge router. The edge router that receives the ARP message updates the routing information which it maintains; in doing so that edge router takes into account the new location of the next-hop.

What makes embodiments of the invention especially efficient is the internal organization of routing data in the edge router: the routing table entries point to a memory location with the next-hop's data (MAC, interface, etc.). Upon reception of the ARP, only this memory location needs to be updated. As a result, the total amount of work necessary to perform a switchover operation when a CM or a CPE goes offline is 1) single ARP message 2) update of a single memory location in the router. Thus, the amount of work necessary to perform a switchover operation is independent of the number of CMs and CPEs serviced by the failed instance, or, in big-O notation, O (1).

When a CM or CPE changes physical location from a first physical location to a second physical location, notifier 220 notifies a first edge router 230 associated with the first location to discard previously provided route data or the particular CM or CPE. Notifier 220 also notifies a second edge router 230 at the second location of route data for the particular CM or CPE. In this way, edge routers 230 may maintain accurate records with a minimum of exchanged messages.

Advantageously, each edge router 230 may support many more routes than ARPs/NDs. This results in greater capacity without increasing the number of edge routers 230 within the system.

Further, as route data is exchanged rather than ARPs/NDs, subnet spanning does not require stretched VLANs.

Prior art systems did not have any way to inform a cable operator that a cable subscriber has physically moved their cable equipment. In an advance of the prior art, embodiments of the invention can provide such information to a cable operator. When a CM or CPE is offline, the route is withdrawn. Thus, route information may be queried and compared with historical records to identify cable equipment which has changed physical locations to be serviced by a different edge router 230. As a result, stable PD may be implemented reliably within a vCMTS system.

Moreover, embodiments of the invention are highly available (HA), fast, and reliable, as edge routers 230 may reroute traffic within the system automatically.

Other Service Platforms

While embodiments have chiefly been described above in terms of examples involving notifier 200 of a service platform corresponding to a virtual Cable Modem Termination System (vCMTS), in conjunction with a particular unit of equipment such as a Cable Modem (CM) or customer premises equipment (CPE), embodiments may also be employed involving other types of service platforms and other types units of equipment. For example, other embodiments of the invention may be employed with a notifier that operates as part of a service platform corresponding to a Passive Optical Network (PON) in conjunction with a unit of hardware corresponding to an Optical Network Unit (ONU)/Optical Network Terminal (ONT) or customer premises equipment (CPE). As another example, embodiments of the invention may be employed with a notifier that operates as part of a service platform corresponding to a Broadband Network Gateway (BNG) in conjunction with a unit of hardware corresponding to an Optical Network Unit (ONU)/Optical Network Terminal (ONT) or customer premises equipment (CPE).

Implementing Mechanisms

Figure 4:
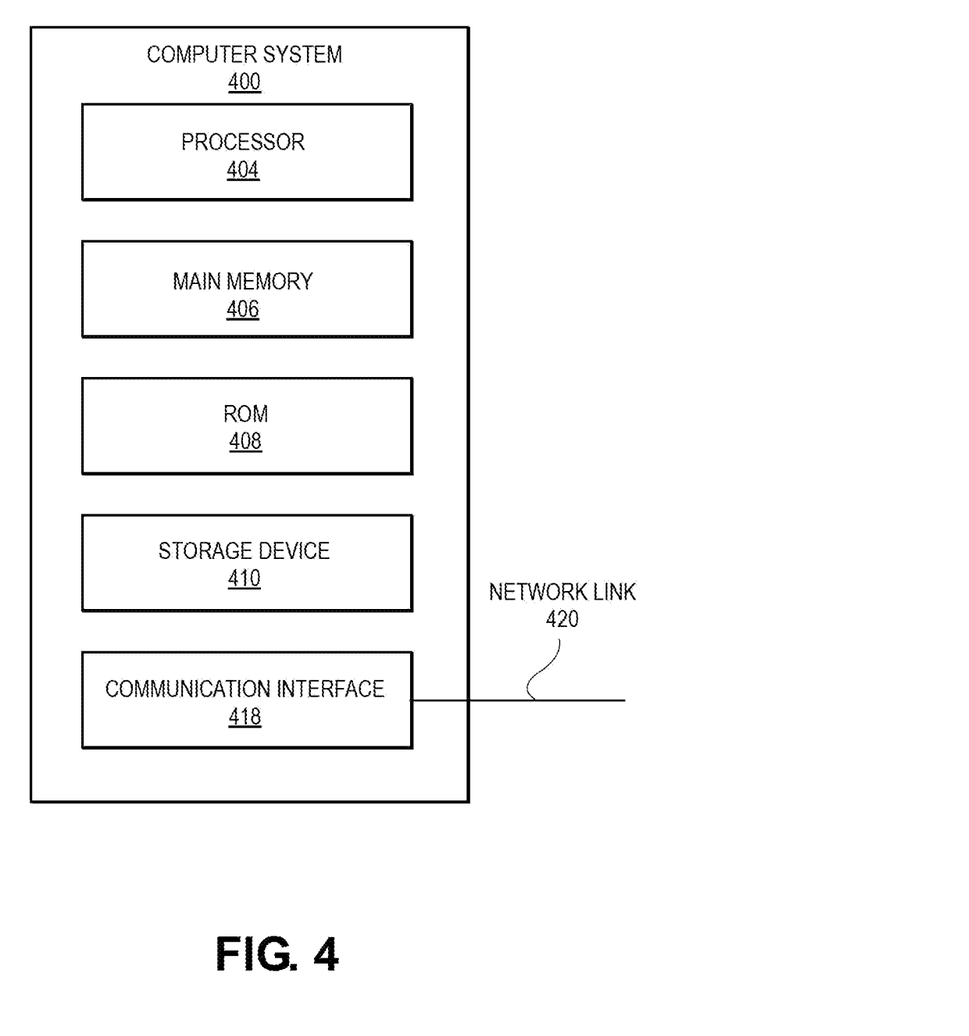
FIG. 4 is a block diagram that illustrates a computer system upon which software performing one or more of the steps or functions discussed referenced by FIG. 3 may be implemented.

FIG. 4 is a block diagram that illustrates a computer system 400 upon which software performing one or more of the steps or functions discussed above with reference to FIG. 3 may be implemented. The computer system 400 shown in FIG. 4 may be COTS computer system and may be used to execute software that corresponds, in whole or in part, to notifier 220 as well as any other software associated with a vCMTS, PON, BNG, or any other type of service platform.

In an embodiment, computer system 400 includes processor 404, main memory 406, ROM 408, storage device 410, and communication interface 418. Computer system 400 includes at least one processor 404 for processing information. Computer system 400 also includes a main memory 406, such as a random-access memory (RAM) or other dynamic storage device, for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device for storing static information and instructions for processor 404. A storage device 410, such as a magnetic disk or optical disk, is provided for storing information and instructions.

Embodiments of the invention are related to the use of computer system 400 for implementing the techniques described herein, e.g., US scheduler 410 may be embodied on a general-purpose or special-purpose computer system. According to one embodiment of the invention, US scheduler 410 may perform any of the actions described herein by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory machine-readable storage medium" as used herein refers to any non-transitory tangible medium that participates in storing instructions which may be provided to processor 404 for execution. Note that transitory signals are not included within the scope of a non-transitory machine-readable storage medium. A non-transitory machine-readable storage medium may take many forms, including but not limited to, non-volatile media and volatile media. Non-volatile media includes, for example, optical or magnetic disks, such as storage device 410. Volatile media includes dynamic memory, such as main memory 406.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a network link 420 to computer system 400.

Communication interface 418 provides a two-way data communication coupling to a network link 420 that is connected to a local network. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through a local network to a host computer or to data equipment operated by an Internet Service Provider (ISP).

Computer system 400 can send messages and receive data, including program code, through the network(s), network link 420 and communication interface 418. For example, a server might transmit a requested code for an application program through the Internet, a local ISP, a local network, subsequently to communication interface 418. The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage mediums that store one or more sequences for supporting a scalable and Highly Available (HA) service platform, which when executed by one or more processors, cause:
   a software component receiving, from the service platform, an update about a particular unit of equipment, wherein the particular unit of equipment is a cable modem (CM), Optical Network Unit (ONU)/Optical Network Terminal (ONT), or customer premises equipment (CPE); and wherein the service platform is a virtual Cable Modem Termination System (vCMTS), a Passive Optical Network (PON), or a Broadband Network Gateway (BNG); and
   in response to receiving the update, the software component providing, to at least one edge router, route data for the particular unit of equipment,
   wherein the route data informs the at least one edge router of a next hop network address for a network address of the particular unit of equipment,
   and wherein the at least one edge router is (a) not provided any Address Resolution Protocol (ARP) data for the particular unit of equipment and (b) not provided any Neighbor Discovery (ND) data for the particular unit of equipment.

2. The one or more non-transitory computer-readable storage mediums of claim 1, wherein the software component executes upon a physical device which is also executing software implementing other functions of the service platform.

3. The one or more non-transitory computer-readable storage mediums of claim 1, wherein the software component executes upon a different physical device than a one or more other physical devices which execute software implementing functions of the service platform.

4. The one or more non-transitory computer-readable storage mediums of claim 1, wherein the software component receives the update from the service platform via a remote procedure call (RPC).

5. The one or more non-transitory computer-readable storage mediums of claim 1, wherein the update results from the particular unit of equipment becoming online or going offline.

6. The one or more non-transitory computer-readable storage mediums of claim 1, wherein the software component provides the route data to the one or more edge routers via Border Gateway Protocol (BGP).

7. The one or more non-transitory computer-readable storage mediums of claim 1, wherein the software component providing, to at least one edge router, route date for the particular unit of equipment comprises:
the software component notifying a first edge router of the route data for the particular unit of equipment; and
the software component instructing a second edge router to discard previously.

8. The one or more non-transitory computer-readable storage mediums of claim 1, wherein each of the at least one router is a commercial-off-the-shelf (COTS) router.

9. The one or more non-transitory computer-readable storage mediums of claim 1, wherein said software component provides all route data to all edge routers in said service platform, and wherein said all edge routers in said service platform perform no inspection of Dynamic Host Configuration Protocol (DHCP) packets to ascertain any route data.

10. The one or more non-transitory computer-readable storage mediums of claim 1, wherein within said service platform, said ARP data and said ND is not exchanged between a core of said service platform and any edge router in said service platform in response to the software component providing said route data to said at least one edge router.

11. An apparatus for supporting a scalable and Highly Available (HA) service platform, comprising:
one or more processors; and
one or more non-transitory computer-readable storage mediums storing one or more sequences of instructions, which when executed by the one or more processors, cause:
a software component receiving, from the service platform, an update about a particular unit of equipment, wherein the particular unit of equipment is a cable modem (CM), Optical Network Unit (ONU)/Optical Network Terminal (ONT), or customer premises equipment (CPE), and wherein the service platform is a virtual Cable Modem Termination System (vCMTS), a Passive Optical Network (PON), or a Broadband Network Gateway (BNG); and
in response to receiving the update, the software component providing, to at least one edge router, route data for the particular unit of equipment,
wherein the route data informs the at least one edge router of a next hop network address for a network address of the particular unit of equipment,
and wherein the at least one edge router is (a) not provided any Address Resolution Protocol (ARP) data for the particular unit of equipment and (b) not provided any Neighbor Discovery (ND) data for the particular unit of equipment.

12. The apparatus of claim 11, wherein the software component executes upon a physical device which is also executing software implementing other functions of the service platform.

13. The apparatus of claim 11, wherein the software component executes upon a different physical device than a one or more other physical devices which execute software implementing functions of the service platform.

14. The apparatus of claim 11, wherein the software component receives the update from the service platform via a remote procedure call (RPC).

15. The apparatus of claim 11, wherein the update results from the particular unit of equipment becoming online or going offline.

16. The apparatus of claim 11, wherein the software component provides the route data to the one or more edge routers via Border Gateway Protocol (BGP).

17. The apparatus of claim 11, wherein the software component providing, to at least one edge router, route date for the particular unit of equipment comprises:
the software component notifying a first edge router of the route data for the particular unit of equipment; and
the software component instructing a second edge router to discard previously.

18. The apparatus of claim 11, wherein each of the at least one router is a commercial-off-the-shelf (COTS) router.

19. The apparatus of claim 11, wherein said software component provides all route data to all edge routers in said service platform, and wherein said all edge routers in said service platform perform no inspection of Dynamic Host Configuration Protocol (DHCP) packets to ascertain any route data.

20. The apparatus of claim 11, wherein within said service platform, said ARP data and said ND is not exchanged between a core of said service platform and any edge router in said service platform in response to the software component providing said route data to said at least one edge router.

21. A method for supporting a scalable and Highly Available (HA) service platform, comprising:
a software component receiving, from the service platform, an update about a particular unit of equipment, wherein the particular unit of equipment is a cable modem (CM), Optical Network Unit (ONU)/Optical Network Terminal (ONT), or customer premises equipment (CPE), and wherein the service platform is a virtual Cable Modem Termination System (vCMTS), a Passive Optical Network (PON), or a Broadband Network Gateway (BNG); and
in response to receiving the update, the software component providing, to at least one edge router, route data for the particular unit of equipment,
wherein the route data informs the at least one edge router of a next hop network address for a network address of the particular unit of equipment,
and wherein the at least one edge router is (a) not provided any Address Resolution Protocol (ARP) data for the particular unit of equipment and (b) not provided any Neighbor Discovery (ND) data for the particular unit of equipment.

22. The method of claim 21, wherein the software component executes upon a physical device which is also executing software implementing other functions of the service platform.

23. The method of claim 21, wherein the software component executes upon a different physical device than a one or more other physical devices which execute software implementing functions of the service platform.

24. The method of claim 21, wherein the software component receives the update from the service platform via a remote procedure call (RPC).

25. The method of claim 21, wherein the update results from the particular unit of equipment becoming online or going offline.

26. The method of claim 21, wherein the software component provides the route data to the one or more edge routers via Border Gateway Protocol (BGP).

27. The method of claim 21, wherein the software component providing, to at least one edge router, route date for the particular unit of equipment comprises:

the software component notifying a first edge router of the route data for the particular unit of equipment; and the software component instructing a second edge router to discard previously provided route data of the particular unit of equipment.

28. The method of claim 21, wherein each of the at least one router is a commercial-off-the-shelf (COTS) router.

29. The method of claim 21, wherein said software component provides all route data to all edge routers in said service platform, and wherein said all edge routers in said service platform perform no inspection of Dynamic Host Configuration Protocol (DHCP) packets to ascertain any route data.

30. The method of claim 21, wherein within said service platform, said ARP data and said ND is not exchanged between a core of said service platform and any edge router in said service platform in response to the software component providing said route data to said at least one edge router.

* * * * *